US008640933B1

(12) United States Patent
McCray

(10) Patent No.: US 8,640,933 B1
(45) Date of Patent: Feb. 4, 2014

(54) VEHICLE CARGO RACK

(76) Inventor: Levi McCray, Sumter, SC (US)

( * ) Notice: Subject to any disclaimer, the term of this patent is extended or adjusted under 35 U.S.C. 154(b) by 437 days.

(21) Appl. No.: 13/042,358

(22) Filed: Mar. 7, 2011

(51) Int. Cl.
*B60R 9/042* (2006.01)

(52) U.S. Cl.
USPC .......................... 224/310; 224/321; 224/325

(58) Field of Classification Search
USPC ......... 224/282, 281, 310, 319, 320, 321, 325, 224/326, 924
See application file for complete search history.

(56) References Cited

U.S. PATENT DOCUMENTS

| | | | | |
|---|---|---|---|---|
| 3,809,425 | A * | 5/1974 | Blaschke | 296/22 |
| 5,421,495 | A * | 6/1995 | Bubik et al. | 224/310 |
| 6,099,232 | A * | 8/2000 | Dixon et al. | 414/494 |
| 6,308,874 | B1 * | 10/2001 | Kim et al. | 224/310 |
| 6,428,263 | B1 * | 8/2002 | Schellens | 414/462 |
| 6,681,970 | B2 * | 1/2004 | Byrnes | 224/310 |
| 6,715,652 | B2 * | 4/2004 | Kmita et al. | 224/314 |
| 6,766,928 | B2 * | 7/2004 | Aftanas et al. | 224/310 |
| 6,827,244 | B1 * | 12/2004 | Stapleton et al. | 224/310 |
| 7,011,239 | B2 * | 3/2006 | Williams | 224/310 |
| 7,048,490 | B2 * | 5/2006 | Henderson | 414/462 |
| 2002/0014504 | A1 * | 2/2002 | Hetu | 224/310 |
| 2002/0185506 | A1 * | 12/2002 | Kmita et al. | 224/310 |
| 2003/0052145 | A1 * | 3/2003 | Aftanas et al. | 224/310 |
| 2003/0201288 | A1 * | 10/2003 | Ford et al. | 224/310 |
| 2003/0218037 | A1 * | 11/2003 | Kmita et al. | 224/310 |
| 2004/0118884 | A1 * | 6/2004 | Ford et al. | 224/310 |
| 2004/0173651 | A1 * | 9/2004 | Kim et al. | 224/310 |
| 2004/0188478 | A1 * | 9/2004 | Williams | 224/310 |
| 2006/0175368 | A1 * | 8/2006 | Fallis et al. | 224/310 |
| 2007/0090139 | A1 * | 4/2007 | McKenzie | 224/310 |

* cited by examiner

*Primary Examiner* — Nathan J Newhouse
*Assistant Examiner* — Corey Skurdal
(74) *Attorney, Agent, or Firm* — Gulf Coast Intellectual Property Group

(57) ABSTRACT

A cargo rack secured to the roof of the vehicle wherein a portion of the cargo rack is operable to be extended beyond the rear roof-line of the vehicle and subsequently placed in an angular position with respect to the roof of the vehicle in order to facilitate the loading of objects within the cargo rack. The cargo rack further includes a first support rail and a second support rail that are securely mounted to the roof of the vehicle. A luggage frame is movably secured to the first support rail and second support rail. The first support rail and the second support rail further include extension members that facilitate the rearward movement of the luggage frame. A front lock is integrally secured to the first support rail and second support rail and is operable to maintain the luggage frame in a secure position. A rear lock is further included and is adjacent to and generally perpendicular with the luggage frame and functions to engage a portion thereof.

7 Claims, 3 Drawing Sheets

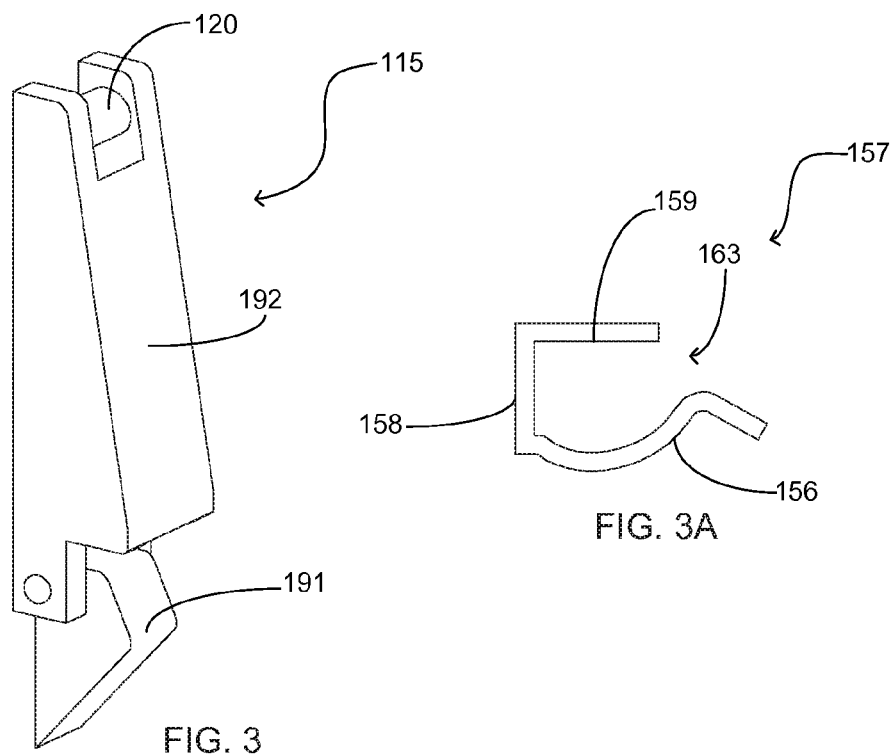
FIG. 3
FIG. 3A
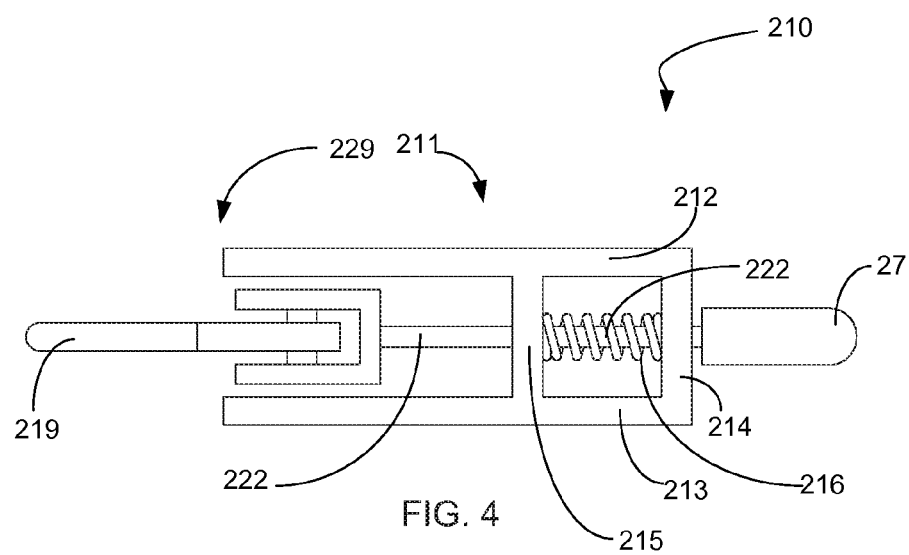
FIG. 4

VEHICLE CARGO RACK

FIELD OF THE INVENTION

The present invention relates to a storage rack, more specifically a vehicle storage rack that facilitates the loading of objects on the roof of a vehicle wherein the vehicle storage rack is movably positioned to permit easier loading thereof.

BACKGROUND

Millions of individuals own automobiles and routinely utilize them for travel for daily errands or longer trips such as but not limited to vacations. There are many type of vehicles that are owned and operated by individuals most often the vehicle operated by an individual is designed to meet the specific need of that individual. For example, larger vehicle such as sport utility vehicles are the most popular type of vehicle in the United States. The sport utility vehicle often has the capacity to carry at least five individuals and additionally have room internally for cargo. The sport utility vehicles are often utilized for vacations as the interior room provided offers the user a more comfortable environment for longer duration trips.

Typically, most sport utility vehicles have as a feature a luggage rack superposed the roof of the vehicle. These luggage racks consistent of two generally parallel support bars that are located on opposing sides of the roof of the vehicle. Additionally, some models of luggage racks that are offered on sport utility vehicles include lateral support bars that are intermediate and generally perpendicular the parallel support bars. These luggage racks function to provide a method to store items such as but not limited to suitcases on the roof of the car when the interior room of the vehicle will not accommodate the suitcases. One problem with utilizing the conventional luggage racks provided on sport utility vehicles is that the luggage racks are often difficult to reach. Some sport utility vehicles have roofs that are at least six feet in height. This height makes hoisting a heavy suitcase or similar object up to the luggage rack very cumbersome and potentially can cause injury to the user. Users can also potentially cause damage to their vehicle as they attempt to manipulate a heavy object up to the luggage rack for storage.

Another issue with conventional luggage rack is that some types do not provide secure storage of objects placed on the roof of the vehicle. A number of sport utility vehicles only offer luggage racks that only consist of two parallel side support bars for which to place luggage intermediate thereto and fasten utilizing suitable methods. These types of luggage racks do not offer proper secure cargo transportation and can often result in the loss or damage of luggage.

Accordingly, there is a need for a luggage and/or cargo rack that is movably positioned such that the cargo rack facilitates the easier loading thereof and wherein the cargo rack provides a secure environment for the transportation of the objects disposed thereon.

SUMMARY OF THE INVENTION

It is the object of the present invention to provide a cargo rack for a vehicle that has a first position and a second position wherein the second position the cargo rack is positioned to facilitate the easier loading thereof.

Another object of the present invention is to provide cargo rack that is integrally secured to the roof of a vehicle that includes lateral and longitudinal support bars in order to provide a secure area to retain cargo.

A further object of the present invention is to provide a cargo rack for a vehicle that includes two longitudinal support bars that further include a slidably extendable portion so as to transition the cargo rack from its first position to its second position.

Yet another object of the present invention is to provide a cargo rack for a vehicle that is operable to be transitioned into a second position for loading wherein at least a portion of the cargo rack is extended beyond the rear perimeter of the roof of the vehicle.

Still another object of the present invention is to provide a cargo rack for a vehicle that is operable to extend beyond the rear perimeter of the roof of the vehicle and subsequently tilt in a generally downward direction.

An additional object of the present invention is to provide a cargo rack for a vehicle that further includes rear supports that function to engage a portion of the cargo rack subsequent the rack being extended beyond the rear perimeter of the roof of the vehicle and tilted in a generally downward direction.

Yet a further object of the present invention is to provide a cargo rack that includes a plurality of locking mechanisms that function to lock the movable portion of the cargo rack so as to substantially inhibit any movement thereof.

Another object of the present invention is to provide a cargo rack that has a portion that is movable so as to facilitate the loading thereof wherein the cargo rack is lightweight and easy to operate.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 3 is a detailed view of the rack support of the present invention; and FIG. 3A is a detailed view of the rack support bracket of the present invention; and FIG. 4 is a detailed view of the rear lock mechanism of the present invention.

DETAILED DESCRIPTION

Figure 1:
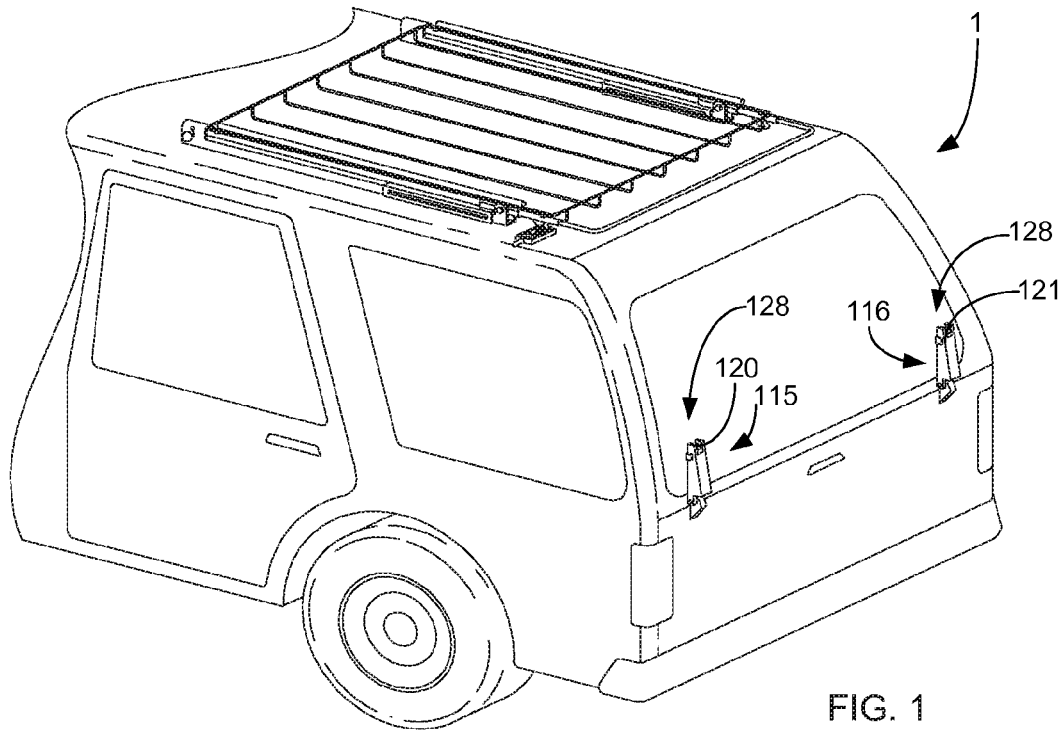
FIG. 1 is perspective view of an embodiment of the present invention in a first position superposed the roof of a vehicle.

Referring now to the drawings submitted herewith, wherein various elements depicted therein are not necessarily drawn to scale and wherein through the views and figures like elements are referenced with identical reference numerals, there is illustrated a cargo rack 100 constructed according to the principles of the present invention.

As shown in particular in FIGS. 1 and 3, the cargo rack 100 further includes a first support rail 5 and a second support rail 7. The first support rail 5 and the second support rail 7 are generally hollow and square in shape and are manufactured from a suitable durable material such as but not limited to metal tubing. The first support rail 5 and second support rail 7 provide structural support for the luggage frame 10 and further function as the primary support for the cargo rack 100 being secured to the vehicle 1. The first support rail 5 and the second support rail 7 are secured to the vehicle utilizing suitable durable methods such as but not limited to mechanical fasteners, chemical adhesives and/or magnetic methods. While in the preferred embodiment illustrated herein, the first support rail 5 and the second support rail 7 have been illustrated as being square tubing, it is contemplated within the scope of the present invention that the first support rail 5 and second support rail 7 could be manufactured from numerous styles of tubing or other similar materials.

The first support rail 5 further includes a first end 15 and a second end 17. Integrally formed with the first end 17 is a front lock housing 20. The front lock housing 20 is manufactured from a suitable durable material such as but not limited to metal and includes an opening 21 configured to accommodate end 29. End 29 is journaled into the opening 21 of the front lock housing 20 when the cargo rack 100 is in its first position. End 29 further includes an aperture 28 that functions to receive the inner rod (not illustrated herein) of the front lock 35. The front lock 35 functions to maintain the cargo rack 100 in its first position wherein the luggage frame 10 is substantially superposed the first support rail 5 and second support rail 7. The front lock 35 includes a knob 34 formed with the aforementioned inner rod, wherein the inner rod is biased with a spring or other similar type device so as to position into the aperture 28. The front lock housing 20 further includes a lock slot 38 that is journaled through the front lock housing 20. The lock slot 38 is generally rectangular in shape having a first end 41 and a second end 42. The first end 41 is shaped such that the width at the first end 41 is narrower than the width at the second end 42 of the lock slot 38. The narrower width of the first end 41 functions to engage the base of the knob 34 so as to substantially inhibit the aforementioned inner rod from journaling into the front lock housing 20. This allows the user to remove the end 29 from the front lock by pulling the knob 34 away from the front lock housing 20 and sliding the knob 34 towards the first end 41. This allows a user to begin to deploy the cargo rack 100 to its second position. As the knob 34 is returned to the second end 42 of the lock slot 38, the aforementioned inner rod is biased inwards into the front lock housing 20 and will engage aperture 28 so as to substantially inhibit the luggage frame 10 from moving while the vehicle 1 is in transit. While an embodiment of a locking mechanism has been discussed and illustrated herein, it is contemplated within the scope of the present invention that numerous variations of the front lock 35 could be used in place of and/or in conjunction with the front lock 35 as described herein.

The cargo rack 100 further includes a second front lock 47 that is secured to the end 49 of the second support rail 7. The second front lock 47 is manufactured and constructed in a similar manner as the front lock 35 as described herein. While a front lock 35 and a second front lock 47 are disclosed herein, it is contemplated within the scope of the present invention that the cargo rack 100 could have as few as one front lock 35.

Proximate end 17 of the first support rail 5 is the extension member 60. The extension member 60 is slidably coupled with the first support rail 5 and functions to allow the luggage frame 10 to be positioned such that it is substantially aft of the rear roof-line 99 of the vehicle 1. The extension member 60 is manufactured from suitable durable materials such as but not limited to metal and is formed in a mateable shape so as to be journaled into the first support rail 5. The extension member 60 further includes a pin 61 that engages the channel slot 4 of the first support rail 5. As the extension member 60 is slidably moved outward from the first support rail 5 the pin 61 remains engaged with the channel slot 4 so as to maintain structural rigidity and alignment during the extension process. While one extension member 60 is illustrated herein, it is contemplated within the scope of the present invention that the extension member 60 could be constructed of several telescoping members so as to increase the distance in which the luggage frame 10 could travel.

Integrally formed on the extension member 60 proximate the second end 63 is a bracket 65. The bracket 65 functions to hingedly connect the extension member 60 to the fitting 70. The bracket 65 further includes a rod 67 that is secured utilizing suitable durable methods to the exterior surface of the fitting 70. The fitting 70 is generally annular in shape and is manufactured from a suitable durable material such as metal tubing. The fitting 70 is surroundably mounted to and slidably engaged with the first lateral luggage frame support member 80. As the cargo rack 100 is transitioned from its first position to its second position, the first lateral luggage frame support member 80 slides through the fitting 70 and traverses therethrough. Those skilled in the art will recognize that there are numerous configurations that could be utilized to hingedly couple the extension member 60 and the first lateral luggage frame support member 80 in order to accomplish the desired objective as described herein.

The first lateral luggage frame support member 80 is generally cylindrical in shape and is manufactured from a suitable durable material such as but not limited to metal. The first lateral luggage frame support member 80 provides general support for the luggage frame 10. The luggage frame 10 includes a plurality of support members 111 that are integrally formed to shape the luggage rack 10 in a generally rectangular shape. The support members 111 are formed such that the luggage frame 10 has an interior volume. Additionally, the luggage rack 10 is formed utilizing the support members 111 such that at least a portion of the support members 111 extend in an upward direction so as to assist in maintaining any item placed within the luggage frame 10. Those skilled in the art should recognize that the luggage frame 10 could be formed in numerous different shapes, sizes and depths to accommodate a variety of items therein. The first lateral luggage frame support member 80 further includes a hook 87. The hook 87 is generally downward facing and functions to engage the bar 120 of the first rear luggage frame support member 115. As the cargo rack 100 is placed in its second position such that substantially all of the luggage frame 10 is positioned rearward of the rear roof-line 99 and the luggage frame 10 is further positioned in an angular manner with respect to the roof 98 of the vehicle 1, the hooks 87,86 function to engage the bars 120, 121 of the first rear luggage frame support member 80 and the second rear luggage frame support member 116 so as to support the luggage frame 10 while a user places items therein.

A handle 130 is intermediate the first lateral luggage frame support member 80 and the second lateral luggage frame support member 180. The handle 130 is generally rod-shaped and is manufactured from a suitable durable material such as but not limited to metal. The handle 130 is formed in a square u-shape and functions to provide an interface for a user to engage the luggage rack 10 so as to move the cargo rack 100 to its second position.

The second lateral luggage frame support member 180 is mounted opposite the luggage frame 10 from the first lateral luggage frame support member 80. The second lateral luggage frame support member 180 is constructed similar to the first lateral luggage frame support member 80 having a first end 129 with and aperture 131 operable to engage the second front lock 47. The second end 137 of the second lateral luggage frame support member 80 is secured to the handle 130. The second lateral luggage frame support member 180 is slidably coupled with the fitting 181. Fitting 181 is constructed substantially similar to fitting 70 as previously discussed herein. Fitting 181 is hingedly connected utilizing suitable methods to bracket 177. The bracket 177 is integrally formed with the second extension member 176. The second extension member 176 is constructed substantially similar to extension member 60 as described herein. The second extension member 176 is slidably coupled with the second support rail 7. A pin 167 is mounted utilizing suitable durable methods to the second extension member 176 and is configured to engage the channel slot 171 of the second support rail 7 so as to maintain structural rigidity and alignment during the cargo rack 100 being transitioned from its first position to its second position.

Referring in particular to FIGS. 3 and 3A, a detailed view of the first rear luggage frame support member 115 is illustrated therein. The first rear luggage frame support member 115 functions to support the luggage frame 10 when the cargo rack 100 is in its second position such that the luggage frame 10 has been substantially extended beyond the rear roof-line 99 of the vehicle 1 and has been placed in an angular manner with respect thereto. The bars 120, 121 of the first and second rear luggage frame support members 115, 116 respectively engage hooks 87, 86 respectively to support the luggage frame 10 subsequent the luggage frame 10 being positioned in an angular manner with respect to the roof 98 of the vehicle 1. The first rear luggage frame support member 115 includes a first portion 191 and a second portion 192. The first portion 191 is hingedly attached to the second portion 192 via pin 193. The first portion 191 is securely mounted to the rear portion of the vehicle 1 as shown in FIG. 1 utilizing suitable durable methods. As the cargo rack 100 is placed in its second position, the second portion 192 is moved to engage the luggage frame 10 so as to maintain the cargo rack 100 in its second position for loading. Those skilled in the art will recognize that the first rear luggage frame support member 115 and second rear luggage frame support member 116 could be manufactured in numerous different shapes and sizes in order to perform the desired function as described herein. FIG. 3A illustrates a keeper 157 that is securely mounted to the vehicle 1 adjacent the member 158 utilizing suitable durable mechanical or chemical methods. Integrally formed with member 158 and generally perpendicular thereto is second member 159. An s-shaped third member 156 is integrally formed with member 158 distal to the second member 159. The keeper 157 is manufactured from a durable resilient material and functions to engage the second portion 192 of the rear luggage frame support members 128 and maintain the rear luggage frame support members 128 in a substantially upright position generally adjacent the rear surface of the vehicle 1. The s-shaped third member 156 is biased in an outward direction so as to engage a section of the second portion 192. Once the second portion 192 has been journaled into the opening 163 of the bracket 157, the s-shaped third member 156 maintains a biased position against the second portion 192 so as to maintain the second portion 192 in a fixed position parallel and adjacent to the rear of the vehicle 1. It is contemplated within the scope of the present invention that the keeper 157 could be formed in numerous different shapes in order to be configured to engage the second portion 192. Additionally, while two rear luggage frame support members 128 are described and illustrated herein, it is contemplated within the scope of the present invention that one or more than two rear luggage frame support members 128 could be utilized.

Figure 2:
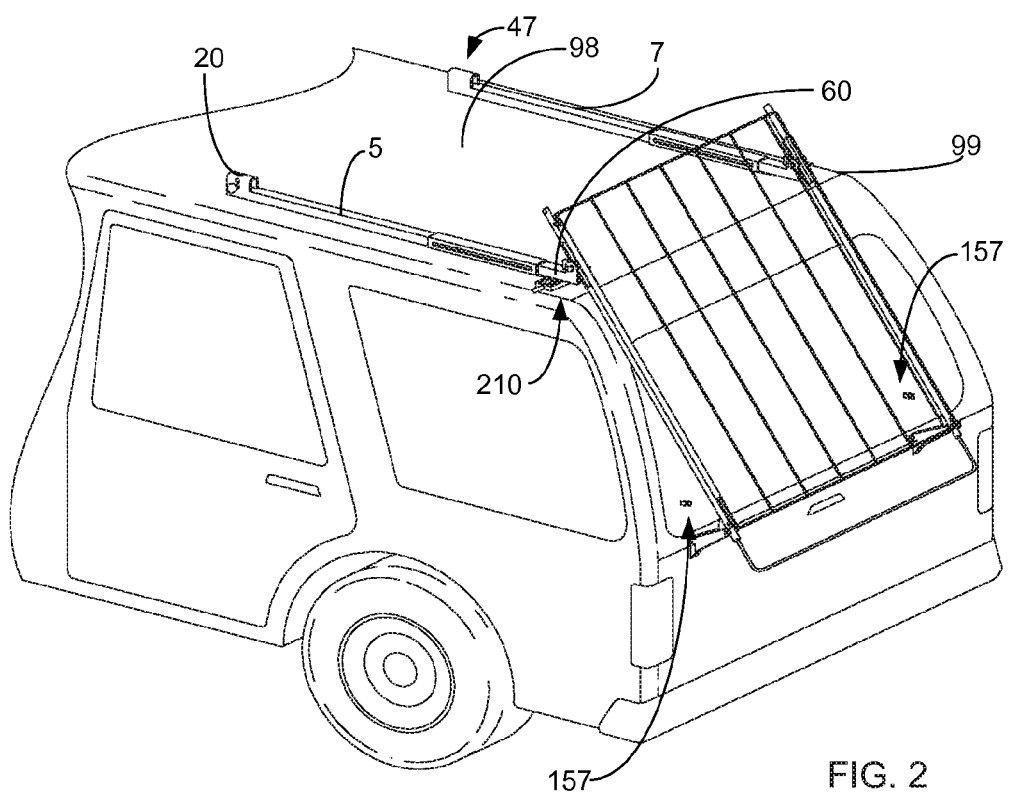
FIG. 2 is perspective view of the embodiment of the present invention in a second position.
Figure 5:
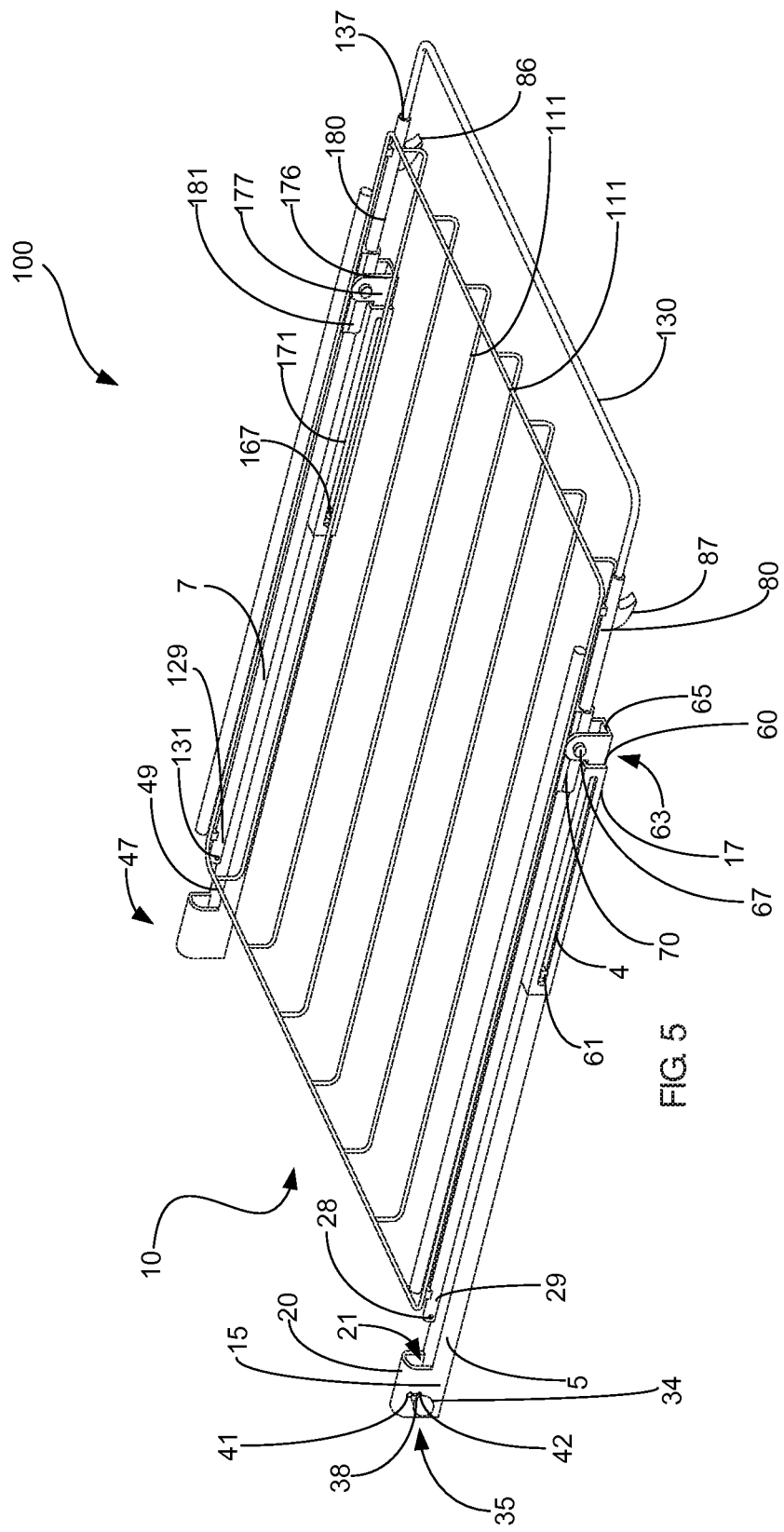
FIG. 5 is a perspective view of the embodiment of the present invention.

Referring in particular to FIG. 4, the rear lock 210 is illustrated therein. The rear lock 210 includes a frame 211 constructed of a suitable durable material such as but not limited to metal. The frame 211 is constructed of a first member 212, second member 213 and third member 214 which are integrally secured to form a square u-shape. A fourth member 215 is intermediate the first member 212 and second member 213 and is generally perpendicular thereto. A handle 217 is mounted to a rod 222 that is journaled through the third member 214 and fourth member 215. The rod 222 further has circumferentially secured thereto a spring 216. The spring 216 is a conventional metal spring and functions to bias the rod 222 in a direction towards end 229. As shown in FIG. 1 and FIG. 2 the rear lock 210 is mounted generally adjacent to and perpendicular with the cargo rack 100. The tip 219 of the rod 222 is positioned such that when the cargo rack 100 is in its first position the tip 219 engages hooks 87, 86 so as to assist in the maintenance of the position of the luggage frame 10 when the cargo rack is in its first position. While only one rear lock 210 is illustrated herein, it is contemplated within the scope of the present invention that up to two rear locks 210 could be utilized to secure the luggage frame 10 when the cargo rack 100 is in its first position.

Referring in particular to FIG. 1 and FIG. 2, a description of the operation of the cargo rack 100 is as follows. In use, the cargo rack 100 is mounted to the vehicle 1 utilizing suitable durable methods. When a user desires to load an object into the luggage frame 10 the user will engage the knob 34 in order to release inner rod of the front lock 35 from the aperture 28. If a second lock is present the user will repeat this step for the second lock. Ensuing the release of the front lock 35, the user will engage the handle 27 of the rear lock 210 and pull the handle 27 such that the tip 219 of the rod 222 is no longer engaged with the hook 87. If the cargo rack 100 is equipped with a second rear lock on the opposing side the user will repeat this step. Following release of the front lock 35 and rear lock 210, the user will engage the handle 130 and pull the luggage frame 10 such that the extension member 60, 176 slide in an outward direction from the first support rail 5 and second support rail 7 such that the luggage frame 10 is substantially positioned rearward of the rear roof-line 99. The luggage frame 10 is then pivoted so that the luggage frame 10 is positioned in an angular manner with respect to the roof 98 of the vehicle 1. Subsequent the luggage frame 10 being positioned in an angular manner as shown in FIG. 2, the user will release the rear luggage frame support members 128 and engage with the hooks 87, 86 so as to provide support for the luggage frame 10 while in the angular position. The user will load the luggage frame 10 with the desired objects. Ensuing the loading of the luggage frame 10 with the desired objects, the user will apply an upwards force to the handle 130 and then an inward force such that the extension members 60, 176 slide back into the first support rail 5 and second support rail 7. This process is continued until the ends 29, 129 have been journaled into front lock hosing 20 and second front lock 47. The user returns the front lock 35 and rear lock 210 so as to engage the luggage frame 10.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A rack secured to a roof of a vehicle comprising:
a first support rail and a second support rail, said first support rail and said second support rail being mounted to the roof of the vehicle, said first support rail, and said second support rail being on opposing sides of the roof of the vehicle, wherein said first support rail and said second support rail further include a first extension member and a second extension member, said first extension member being slidably engaged with said first support rail, said second extension member being slidably engaged with said second support rail;
a frame, said frame further including a plurality of support members, said plurality of support members oriented in a manner so as to form a compartment operable to receive an object therein, said frame being movably connected to said first support rail and said second support rail, said frame having a first position and a second position, wherein said first extension member and said second extension member operable to move said frame wherein said frame is substantially rearward of the roof of the vehicle;
a first fitting and a second fitting, said first fitting being mounted to said first extension member, said second fitting being mounted to said second extension member, said first fitting and said second fitting being hingedly connected to said first extension member and said second extension member respectively, said first fitting and said second fitting operable to facilitate the transition of said frame to said second position, wherein in said second position said frame is substantially rearward of the roof of the vehicle and further positioned in an angular manner with respect to the roof of the vehicle;
at least one front lock, said at least one front lock being integral with said first support rail, said front lock operable to receive at least a portion of said frame, said at least one front lock operable to maintain said frame in said first position;
at least one rear lock, said at least one rear lock being mounted to the roof of the vehicle, said at least one rear lock being adjacent to and perpendicular with said frame, said at least one rear lock operable to engage at least a portion of said frame when said frame is in said first position;
at least one rear frame support, said at least one rear frame support being secured to the rear side of the vehicle, said at least one rear frame support operable to engage and support said frame subsequent said frame being placed in said second position, wherein said frame further includes at least one hook, said at least one hook operable to engage said at least one rear frame support subsequent said frame being positioned in said second position; and
wherein in said first position said frame is generally superposed said first support rail and said second support rail.

2. A luggage rack secured to the roof of a vehicle wherein the luggage rack is operable to slide rearward and further be oriented in a manner wherein the luggage rack is angular to the roof of the vehicle to facilitate the loading of objects therein comprising:
a first support rail and a second support rail, said first support rail and said second support rail being secured to the roof of the vehicle, said first support rail and said second support rail being manufactured from square tubing, said first support rail having a first end and a second end, said second support rail having a first end and a second end, said first support rail being substantially hollow, said second support rail being substantially hollow, said first support rail further including a channel slot proximate said second end, said second support rail further including a channel slot proximate said second end, said first support rail and said second support rail being on opposing sides of the roof of the vehicle;
a luggage frame, said luggage frame further including a first lateral support member, said first lateral support member being generally elongated and cylindrical in shape, said first lateral support member having a first end and a second end, said first end of said first lateral support member further including an aperture, said first lateral support member being superposed said first support rail, said first lateral support member further including a hook, said hook being proximate said second end of said first lateral support member, said luggage frame further including a second lateral support member, said second lateral support member being superposed said second support rail, said second lateral support member being elongated and cylindrical in shape, said second lateral support member having a first end and a second end, said first end of said second lateral support member further including an aperture, said second lateral support member further including a hook, said hook being proximate said second end of said second lateral support member, said luggage frame further including a plurality of support members, said plurality of support members oriented in a manner so as to form a compartment operable to receive an object therein, said plurality of support members being connected intermediate said first lateral support member and said second lateral support member, said first lateral support member and said second lateral support member being movably connected to said first support rail and said second support rail, said luggage frame having a first position and a second position;
wherein said luggage frame in said second position is extended beyond the rear portion of the roof of the vehicle and placed in an angular manner thereto so as to receive objects therein.

3. The luggage rack as recited in claim 2, wherein said first support rail has slidably coupled therewith a first extension member, said first extension member being manufactured from square tubing, said first extension member having a first end and a second end, said first extension member further including a pin, said pin being mounted proximate said first end of said first support rail, said pin configured to engage said channel slot slot, said first end of said first extension member being journaled into said first support rail, said second end of said first extension member further including a bracket.

4. The luggage rack as recited in claim 3, wherein said second support rail has slidably coupled therewith a second extension member, said second extension member being manufactured from square tubing, said second extension member having a first end and a second end, said first end of said second extension member being journaled into said second support rail, said second support rail further including a pin, said pin being proximate said first end of said second support rail, said pin operable to engage said channel slot of said second support rail, said second end of said second extension member further including a bracket.

5. The luggage rack as recited in claim 4, and further including at least one front lock, said at least one front lock being integral with said first end of said first support rail, said front lock further including a housing, said housing being formed to have an interior volume, said housing operable to receive said first end of said first lateral support rail, said at least one front lock configured to engage said aperture of said first end of said first lateral support rail, said at least one front lock operable to maintain said luggage frame in said first position.

6. The luggage rack as recited in claim 5, and further including at least one rear lock, said at least one rear lock being mounted to the roof of the vehicle, said at least one rear lock being adjacent to and perpendicular with said luggage frame, said at least one rear lock operable to engage said hook of said first lateral support member.

7. The luggage rack as recited in claim 6, and further including at least one rear frame support, said at least one rear frame support being secured to the rear side of the vehicle, said at least one rear frame support having an upper portion and a lower portion, said lower portion being secured to the rear surface of the vehicle, said upper portion being hingedly attached to said lower portion, said upper portion further including a bar, said bar operable to engage said hook of said first lateral support member subsequent the luggage frame being placed in said second position.

* * * * *